United States Patent

Shiraiwa et al.

[11] Patent Number: 5,169,921
[45] Date of Patent: Dec. 8, 1992

[54] POLYURETHANE TYPE CURABLE COATING COMPOSITION

[75] Inventors: Tetsuo Shiraiwa, Nara; Shigeo Mori, Kyoto, both of Japan

[73] Assignee: Dai-Ichi Kogyo Seiyaku Co., Ltd., Kyoto, Japan

[21] Appl. No.: 831,138

[22] Filed: Feb. 4, 1992

[30] Foreign Application Priority Data

Feb. 4, 1991 [JP] Japan .................... 3-35646
Feb. 4, 1991 [JP] Japan .................... 3-35647

[51] Int. Cl.$^5$ ............................. C08G 18/80
[52] U.S. Cl. ............................. 528/45; 528/76; 528/79
[58] Field of Search ............... 528/45, 76, 79

*Primary Examiner*—Maurice J. Welsh
*Attorney, Agent, or Firm*—Jordan and Hamburg

[57] ABSTRACT

The invention relates to a polyurethane type curable coating composition. This coating composition comprises an organic compound having a number average molecular weight of 300 to 20,000, which is represented by formula (1), and a polyisocyanate compound.

$$Z-[(A)_m-(B)_a-H]_k \quad (1)$$

wherein
A means $$-CH_2-CH-O-$$
$$\quad\quad |$$
$$CH_2O-(R^1-O)_n-R^2;$$

B means $-R^3O-$;
the mode of bonding between A and B may be random or block;
Z means an active hydrogen compound residue;
$R^1$ means an alkylene group containing 1 to 10 carbon atoms;
$R^2$ means an alkyl group, an alkenyl group, an aryl group, an alkylaryl group or an aralkyl group each containing 1 to 20 carbon atoms;
$R^3$ means an alkylene group containing 2 to 30 carbon atoms;
a means a number of 0 to 100;
k means a number of 1 to 12;
m means a number of 1 to 250; and
n means a number of 0 to 5.

Coating a substrate with the coating composition of the invention yields a coating film which is high in flexibility and adhesion to the substrate even at low temperature.

3 Claims, No Drawings

POLYURETHANE TYPE CURABLE COATING COMPOSITION

BACKGROUND OF THE INVENTION

The present invention relates to polyurethane type curable coating compositions. More particularly, the invention relates to a coating composition insuring a high degree of adhesion to substrates even at low temperature.

In order to improve the adhesive affinity for substrates of polyurethane type curable coating compositions, many efforts have been made to modify the starting material polyether. For example, it has been proposed to use an ethylene oxide-propylene oxide random copolymer to provide an amorphous polyether segment and thereby increase the low-temperature flexibility and, hence, adhesion of polyurethane coating films.

However, insofar as polyurethane type curable coating compositions are based on such conventional polyethers, the basically linear structure of the polyether does not insure a sufficient low-temperature flexibility of the cured coating film with consequent limited adhesion to the substrate, thus restricting the usage of the compositions.

SUMMARY OF THE INVENTION

The present invention has been accomplished to solve the above problems.

The invention is, therefore, directed to a polyurethane type curable coating composition comprising an organic compound having a number average molecular weight of 300 to 20,000, which is represented by the following general formula (1), and a polyisocyanate compound.

$$Z\text{-}[(A)_m\text{---}(B)_a\text{---}H]_k \qquad (1)$$

wherein A means

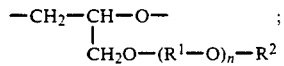

B means —$R^3O$—;
the mode of bonding between A and B may be random or block;
Z means an active hydrogen compound residue;
$R^1$ means an alkylene group containing 1 to 10 carbon atoms;
$R^2$ means an alkyl group, an alkenyl group, an aryl group, an alkylaryl group or an aralkyl group each containing 1 to 20 carbon atoms;
$R^3$ means an alkylene group containing 2 to 30 carbon atoms;
a means a number of 0 to 100;
k means a number of 1 to 12;
m means a number of 1 to 250; and
n means a number of 0 to 5.

DETAILED DESCRIPTION OF THE PREFERRED EMBODIMENTS

The organic compound of general formula (1) may be a compound obtainable by reacting an active hydrogen compound with a glycidyl ether, where necessary further with an alkylene oxide, in the presence of a catalyst under conditions such that the organic compound may have a molecular weight of 300 to 20,000.

The active hydrogen compound mentioned above includes, among others, polyhydric alcohols such as ethylene glycol, propylene glycol, 1,4-butanediol, glycerol, trimethylolpropane, pentaerythritol, sorbitol, sucrose, polyglycerol, etc., amines such as butylamine, 2-ethylhexylamine, ethylenediamine, hexamethylenediamine, diethylenetriamine, triethylenetetramine, tetraethylenepentamine, pentaethylenehexamine, aniline, benzylamine, phenylenediamine, etc., phenolic active hydrogen compounds such as bisphenol A, hydroquinone, Novolac, and etc., and compounds having two or more different active hydrogen groups, such as monoethanolamine, diethanolamine and so on.

The glycidyl ether [the compound used as the starting material of component A in general formula (1)] which is to be reacted with said active hydrogen compound includes, among others, methyl glycidyl ether, ethyl glycidyl ether, and the alkyl, alkenyl, aryl, alkylaryl or aralkyl-polyalkylene glycol glycidyl ethers of the following general formula (2)

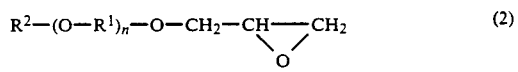

wherein $R^1$ means an alkylene group containing 1 to 10 carbon atoms; $R^2$ means a $C_{1\text{-}20}$ alkyl, alkenyl, aryl, alkylaryl or aralkyl group, such as methyl, ethyl, butyl, isopropyl, sec-butyl, tert-butyl, vinyl, allyl, phenyl, nonylphenyl, tolyl, benzyl, etc.; n means a number of 0 to 5.

In reacting the glycidyl ether as the starting material of component (A) with the active hydrogen compound, an alkylene oxide of 2 to 30 carbon atoms, which is the starting material of component (B), may be reacted in a proportion that will not affect the inherent characteristics of organic polymers. Such alkylene oxide includes, among others, ethylene oxide, propylene oxide, butylene oxide, hexene oxide, cyclohexene oxide, nonene oxide, and o-olefin oxides containing 12 to 28 carbon atoms. When, of these alkylene oxides, an alkylene oxide of 2 to 3 carbon atoms, viz. ethylene oxide or propylene oxide, is employed, there is obtained a polyurethane type curable coating composition having a particularly high degree of adhesion to hydrophilic substrates. When an alkylene oxide of 4 to 30 carbon atoms is used, there is obtained a polyurethane type curable coating composition having a high degree of adhesion particularly to hydrophobic substrates. Furthermore, the mode of bonding between components (A) and (B) may be block or random, and the order of reacting said glycidyl ether and alkylene oxide with the active hydrogen compound may also be optional.

When no alkylene oxide is employed [when a=0 in general formula (1)], there is obtained a polyurethane type curable coating composition showing a particularly high degree of adhesion to hydrophilic substrates.

The catalyst to be used in this reaction is generally a basic catalyst such as sodium methoxide, sodium hydroxide, potassium hydroxide, lithium carbonate, etc., although a Lewis acid catalyst such as boron trifluoride or an amine catalyst such as trimethylamine or triethylamine is also useful. The amount of the catalyst may be the same as the amount commonly employed.

The isocyanates to be used in the invention includes, among others, 2,4-tolylene diisocyanate (2,4-TDI), 2,6- tolylene diisocyanate (2,6-TDI), 4,4'-diphenylmethane diisocyanate (MDI), hexamethylene diisocyanate (HMDI), isophorone diisocyanate, triphenylmethane triisocyanate, tris(isocyanatophenyl)-thiophosphate, lysine ester triisocyanates, 1,8-diisocyanato-4-isocyanatomethyloctane, 1,6,11-undecane triisocyanate, 1,3,6-hexamethylene triisocyanate, bicycloheptane triisocyanate, HMDI biuret, HMDI isocyanurate, trimethylolpropane-TDI (3 moles) adduct, etc. and various mixture thereof.

The polyisocyanate compounds mentioned above may be used in the form of blocked isocyanates. As blocking agents, there may be mentioned methyl ethyl ketoxime (MEKO), phenol, caprolactam, ethyl acetoacetate, methanol, sodium hydrosulfite and so on. The blocking can be achieved by adding such a blocking agent to the polyisocyanate compound and allowing the mixture to react at 30°–90° C. for 0.5 to 2 hours.

In reacting the organic compound of general formula (1 with the polyisocyanate compound, the two material compounds are admixed and reacted in a ratio such that the number of isocyanato groups in said polyisocyanate compound (crosslinking agent) is 1 to 2.5 times the number of terminal hydroxy groups in the organic compound. The use of a catalyst is instrumental for bringing the reaction to early completion. The catalyst for this purpose includes, among others, organometal catalysts such as dibutyltin dilaurate (DBTDL), dibutyltin diacetate (DBTA), phenylmercury propionate, lead octoate, etc., and amine catalysts such as triethylenediamine, N,N'-dimethylpiperazine, N-methylmorpholine, tetramethylguanidine, triethylamine and so on. Furthermore, in addition to the organic compound of general formula (1) and said polyisocyanate compound, a polyether polyol may also be used within the range not adversely affecting the inherent characteristics of the starting materials. The polyether polyol mentioned just above may be a compound obtainable by addition-polymerizing an alkylene oxide, e.g. ethylene oxide or propylene oxide, with said active hydrogen compound and removing the catalyst from the reaction product by an ordinary purification procedure.

The hydrophilic substrate which can be covered with the coating composition of the present invention includes, among others, a diversity of materials having hydrophilic surfaces, such as metal, glass, ceramics, stone, concrete, cement and so on. Moreover, inherently hydrophobic substrates having surfaces rendered hydrophilic either artificially or spontaneously are also included. The hydrophobic material which can be advantageously covered with the coating composition of the invention includes, among others, various hydrophobic resins including polyolefin resins, e.g. polyethylene, polypropylene, etc., ABS resin, acrylic resin, polyamide resin, polyvinyl chloride resin, polycarbonate resin, polyacetal resin, phenolic resin and so on.

When such a substrate is covered with the polyurethane type curable coating composition of the invention, there is obtained a coat having excellent flexibility and a high degree of adhesion to the surface of the substrate even at low temperature. Therefore, the invention can find application, with excellent results, in the field of coatings and protective films where high low-temperature flexibility and adhesion are essential.

The following examples and comparative examples are further illustrative but by no means limitative of the invention.

EXAMPLE 1

A 5 l autoclave was charged with 70 g of glycerol and 12 g of potassium hydroxide and heated to 120° C. Then, 4,017 g of methyldiethylene glycol glycidyl ether of the formula

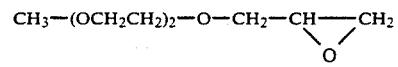

was introduced portionwise over a period of 6 hours. The reaction was further continued at the same temperature for 2 hours. After completion of the reaction, the reaction product was purified to give 3,600 g of an organic compound having a viscosity of 340 cps (25° C.) and a number average molecular weight, as calculated from the OH value, of 4,000.

This organic compound corresponds to general formula (1) wherein

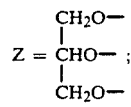

$R^1 = -CH_2CH_2-$; $R^2 = CH_3-$; $n=2$; $m=10$; and $k=3$.

To 100 g of the organic compound synthesized above was added a solution of 6.5 g of 2,6-tolylene diisocyanate and 0.05 g of dibutyltin dilaurate in 50 g of methyl ethyl ketone to prepare a curable coating composition.

This curable coating composition was coated on a steel sheet (JIS K5400) and caused to dry and cure at 150° C. for 1 hour to give a sample having a coating thickness of 50 μm (S-1).

EXAMPLE 2

A 5 l autoclave was charged with 134 g of trimethylolpropane and 10 g of potassium hydroxide and heated to 120° C. Then, 3,120 g of n-butyltriethylene glycol glycidyl ether of the following formula

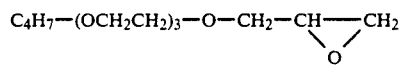

was introduced portionwise over a period of 6 hours. Then, the reaction was further carried out at the same temperature for 2 hours. After completion of the reaction, the reaction product was purified to give 2,900 g of an organic compound having a viscosity of 400 cps (25° C.) and a number average molecular weight, as calculated from the OH value, of 2,800.

This organic compound corresponds to formula (1) wherein

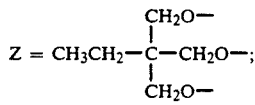

To 100 g of the organic compound synthesized above was added 18 g of hexamethylene diisocyanate and the mixture was stirred at 90° C. for 4 hours. Following this reaction, 28 g of methyl ethyl ketoxime (MEKO) was added and the mixture was stirred at 60° C. for 1 hour.

Then, 10.7 g of polyethylene glycol (average molecular weight 200), 0.05 g of dibutyltin dilaurate and 50 g of methyl ethyl ketone were added to prepare a curable coating composition.

The above curable coating composition was coated on a steel sheet (JIS K5400) and caused to dry and cure at 150° C. for 1 hour to provide a sample having a coating thickness of 50 μm (S-2).

EXAMPLE 3

A 5 l autoclave was charged with 76 g of propylene glycol and 2 g of potassium hydroxide and heated to 120° C. Then, 828 g of phenylhexaethylene glycol glycidyl ether of the following formula

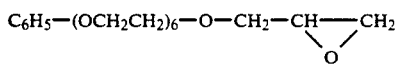

was introduced portionwise over a period of 2 hours. The reaction was further continued at the same temperature for 1 hour, at the end of which time the reaction product was purified to give 600 g of an organic compound having a viscosity of 500 cps (25° C.) and a number average molecular weight, as calculated from the OH value, of 700.

This organic compound corresponds to general formula (1) wherein

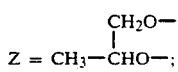

$R^1 = -CH_2CH_2-$; $R^2 = C_6H_5-$; n=6; m=1 and k=2.

To 100 g of the organic compound synthesized above was added a solution of 35 g of triphenylmethane triisocyanate and 0.05 g of dibutyltin dilaurate in 50 g of methyl ethyl ketone to give a curable coating composition.

This curable coating composition was coated on a steel sheet (JIS K5400) and caused to dry and cure at 150° C. for 1 hour to provide a sample having a coating thickness of 50 μm (S-3).

EXAMPLE 4

A 12.5 l autoclave was charged with 50 g of pentaerythritol and 11 g of potassium hydroxide and heated to 120° C. Then, 4,529 g of methyltripropylene glycol glycidyl ether of the following formula

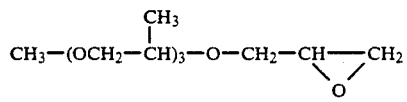

and, then, 100 g of ethylene oxide were introduced over a period of 7 hours block reaction). The reaction was further continued at the same temperature for 2 hours. After completion of the reaction, the reaction product was purified to give 4,300 g of an organic compound having a viscosity of 430 cps (25° C.) and a number average molecular weight, as calculated from the OH value, of 8,000.

This organic compound corresponds to general formula (1) wherein

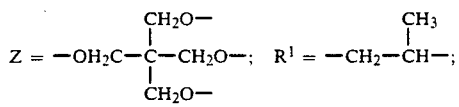

$R^2=CH_3-$; n=3; m=14; $R^3=-CH_2CH_2-$; a=2; k=4.

To 100 g of the organic compound synthesized above was added a solution of 6.2 g of 4,4'-diphenylmethane diisocyanate and 0.05 g of dibutyltin dilaurate in 50 g of methyl ethyl ketone to give a curable coating composition.

This curable coating composition was coated on a steel sheet (JIS K5400) and caused to dry and cure at 150° C. for 1 hour to provide a sample having a coating thickness of 50 μm (S-4).

EXAMPLE 5

In the presence of 12 g of potassium hydroxide, 30 g of ethylenediamine was reacted with 4,500 g of phenyl glycidyl ether of the following formula

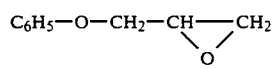

and, then, with 111 g of propylene oxide at 120° C. for 7 hours (block reaction). The reaction was further continued at the same temperature for 2 hours. After completion of the reaction, the reaction product was purified to give 4,300 g of an organic compound having a viscosity of 2,000 cps (25° C.) and a number average molecular weight, as calculated from the OH value, of 6,000.

This organic compound corresponds to general formula (1) wherein

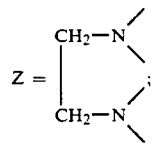

$R^2=C_{62}H_5-$;

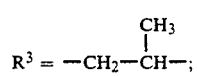

n=0, m=15, k=4, and a=1.

To 100 g of the organic compound synthesized above was added a solution of 5.7 g of 2,6-tolylene diisocyanate and 0.05 g of dibutyltin dilaurate in 50 g of methyl ethyl ketone to give a curable coating composition.

The above curable coating composition was coated on a steel sheet (JIS K5400) and caused to dry and cure at 150° C. for 1 hour to provide a sample having a coating thickness of 50 μm (S-5).

COMPARATIVE EXAMPLE 1

In a 5 l autoclave, 92 g of glycerol was reacted with 3,200 g of alkylene oxide (ethylene oxide/propylene oxide=80/20, by weight) in the presence of 9 g of potassium hydroxide at 120° C. for 6 hours (random reaction) and the reaction was further continued at the same temperature for 2 hours. After completion of the reaction, the reaction product was purified to provide 2,900 g of an organic compound having a viscosity of 1,080 cps (25° C.) and a number average molecular weight, as calculated from the OH value, of 3,000.

To 100 g of the organic compound synthesized above was added a solution of 8.7 g of 2,6-tolylene diisocyanate and 0.05 g of dibutyltin dilaurate in 50 g of methyl ethyl ketone to give a curable coating composition.

The above curable coating composition was coated on a steel sheet (JIS K5400) and caused to dry and cure at 150° C. for 1 hour to provide a sample having a coating thickness of 50 μm [S-6].

COMPARATIVE EXAMPLE 2

In a 5 l autoclave, 136 g of pentaerythritol was reacted with 4,500 g of alkylene oxide (ethylene oxide/propylene oxide=50/50, by weight) in the presence of 12 g of potassium hydroxide at 120° C. for 8 hours random reaction) and the reaction was further continued at the same temperature for 2 hours. After completion of the reaction, the reaction product was purified to give 4,100 g of an organic compound having a viscosity of 3,200 cps (25° C.) and a number average molecular weight, as calculated from the OH value, of 3,800.

To 100 g of the organic compound synthesized above was added a solution of 8.8 g of hexamethylene diisocyanate and 0.05 g of dibutyltin dilaurate in 50 g of methyl ethyl ketone to provide a curable coating composition.

The above curable coating composition was coated on a steel sheet (JIS K5400) and caused to dry and cure at 150° C. for 1 hour to provide a sample having a coating thickness of 50 μm (S-7).

EVALUATION OF ADHESION (1)

Each of the test samples prepared in Examples 1 through 5 and Comparative Examples 1 and 2 was evaluated for adhesion as follows. Thus, each sample was allowed to stand at the various temperatures shown in Table 1 for one week and, then, subjected to Erichsen test (JIS K5400). The results are shown in Table 1.

TABLE 1

|  | Sample | Score −5° C. | Score 5° C. | Score 25° C. |
|---|---|---|---|---|
| Example | S-1 | 10 | 10 | 10 |
|  | S-2 | 10 | 10 | 10 |
|  | S-3 | 8 | 10 | 10 |
|  | S-4 | 10 | 10 | 10 |
|  | S-5 | 8 | 10 | 10 |
| Comparative | S-6 | 0 | 2 | 8 |
| Example | S-7 | 2 | 4 | 8 |

EVALUATION OF ADHESION (2)

For estimating the degree of adhesion of the test samples prepared in Examples 1 through 5 and Comparative Examples 1 and 2, each sample was allowed to stand at the varying temperatures shown in Table 2 for one week and, then, subjected to flexure resistance test (JIS K5400). The results are shown in Table 2.

TABLE 2

|  | Sample | Evaluation score −5° C. | Evaluation score 25° C. |
|---|---|---|---|
| Example | S-1 | ○ | ○ |
|  | S-2 | ○ | ○ |

TABLE 2-continued

|  | Sample | Evaluation score −5° C. | Evaluation score 25° C. |
|---|---|---|---|
|  | S-3 | ○ | ○ |
|  | S-4 | ○ | ○ |
|  | S-5 | ○ | ○ |
| Comparative | S-6 | x | ○ |
| Example | S-7 | x | ○ |

○: No cracks or peeling of the coating
x: Cracks and peeling of the coating

It will be apparent from Tables 1 and 2 that the polyurethane type curable coating composition of this invention insures excellent flexibility and adhesion to hydrophilic substrates even at low temperature.

EXAMPLE 6

A 5 l autoclave was charged with 70 g of glycerol and 12 g of potassium hydroxide and heated to 120° C. Then, 4,017 g of methyldiethylene glycol glycidyl ether of the formula

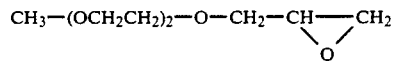

and, then, 164 g of butylene oxide were serially introduced over a period of 6 hours (block reaction) and the reaction was further continued at the same temperature for 2 hours. After completion of the reaction, the reaction product was purified to give 3,600 g of an organic compound having a viscosity of 410 cps (25° C.) and a number average molecular weight, as calculated from the OH value, of 4,200.

This organic compound corresponds to general formula (1) wherein

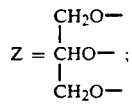

$R^1 = -CH_2CH_2-$; $R^2 = CH_3-$; $n=2$, $m=10$, $k=3$; $R^3 =$ a $C_4$ alkylene group; and $a=1$.

To 100 g of the organic compound synthesized above was added a solution of 6.2 g of 2,6-tolylene diisocyanate and 0.05 g of dibutyltin dilaurate in 50 g of methyl ethyl ketone to provide a curable coating composition.

The above curable coating composition was coated on the surface of an injection-molded polypropylene (Noblen ® JS, Mitsui Toatsu Chemical) sheet (200 mm×5 mm×3 mm, the same applies hereafter) and caused to dry and cure at 120° C. for 30 minutes to provide a sample having a coating thickness of 10 μm (S-8).

EXAMPLE 7

In the presence of 10 g of potassium hydroxide, 134 g of trimethylolpropane was reacted with 3,120 g of n-butyl triethylene glycol glycidyl ether of the formula

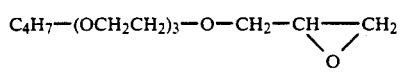

and, then, 600 g of hexene oxide at 120° C. for 6 hours (block reaction) and the reaction was further continued at the same temperature for 2 hours. After completion of the reaction, the reaction product was purified to give 3,100 g of an organic compound having a viscosity of 450 cps (25° C.) and a number average molecular weight, as calculated from the OH value, of 3,200.

This organic compound corresponds to general formula (1) wherein

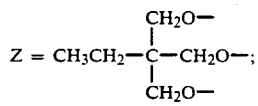

$R^1 = -CH_2CH_2-$; $R^2 = C_4H_7-$; $n=3$; $m=4$; $k=3$; $R^3 =$ a $C_6$ alkylene group; and $a=2$.

To 100 g of the organic compound synthesized above was added 15.8 g of hexamethylene diisocyanate and the mixture was stirred at 90° C. for 4 hours. Then, 9.4 g of polyethylene glycol (average molecular weight, 200), 0.05 g of dibutyltin dilaurate and 50 g of methyl ethyl ketone were added to prepare a curable coating composition.

The above curable coating composition was coated on the surface of a polypropylene sheet and caused to dry and cure at 120° C. for 30 minutes to provide a sample having a coating thickness of 10 μm (S-9).

EXAMPLE 8

A 5 l autoclave was charged with 76 g of propylene glycol and 4 g of potassium hydroxide and heated to 120° C. Then, 828 g of phenylhexaethylene glycol glycidyl ether of the formula

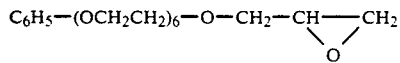

and, then, 392 g of α-olefin oxide containing 12-14 carbon atoms were introduced over a period of 3 hours (block reaction). The reaction was further continued at the same temperature for 2 hours. After completion of the reaction, the reaction product was purified to give 1,000 g of an organic compound having a viscosity of 700 cps (25° C.) and a number average molecular weight, as calculated from the OH value, of 900.

This organic compound corresponds to general formula (1) wherein

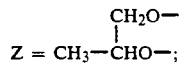

$R^1 = -CH_2CH_2-$; $R^2 = C_6H_5-$; $n=6$; $m=1$; $k=2$; $R^3 =$ a $C_{12-14}$ alkylene group; and $a=1$.

To 100 g of the organic compound synthesized above was added a solution of 27.4 g of triphenylmethane triisocyanate and 0.05 g of dibutyltin dilaurate in 50 g of methyl ethyl ketone to prepare a curable coating composition.

This curable coating composition was coated on the surface of a polypropylene sheet and caused to dry and cure at 120° C. for 30 minutes to give a sample having a coating thickness of 10 μm (S-10).

EXAMPLE 9

A 5 l autoclave was charged with 40 g of pentaerythritol and 9 g of potassium hydroxide and heated to 120° C. Then, 424 g of butylene oxide and 2,806 g of methyltripropylene glycol glycidyl ether of the formula

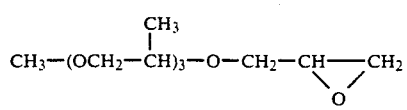

were serially introduced over a period of 6 hours (block reaction). The reaction was further continued at the same temperature for 2 hours. After completion of the reaction, the reaction product was purified to give 2,900 g of an organic compound having a viscosity of 470 cps (25° C.) and a number average molecular weight, as calculated from the OH value, of 8,000.

This organic compound corresponds to general formula (1) wherein

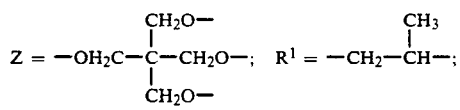

$R^2 = CH_3-$; $n=3$; $m=9$; $k=4$; $R^3 =$ a $C_4$ alkylene group; and $a=5$.

To 100 g of the organic compound synthesized above was added a solution of 6.2 g of 4,4-diphenylmethane diisocyanate and 0.05 g of dibutyltin dilaurate in 50 g of methyl ethyl ketone to prepare a curable coating composition.

This curable coating composition was coated on the surface of a polypropylene sheet and caused to dry and cure at 120° C. for 30 minutes to give a sample having a coating thickness of 10 μm (S-11).

EXAMPLE 10

A 5 l autoclave was charged with 25 g of ethylenediamine and 12 g of potassium hydroxide and heated to 120° C. Then, 2,500 g of phenyl glycidyl ether of the formula

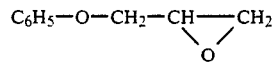

and, then, 1,667 g of hexene oxide were introduced over a period of 7 hours (block reaction). The reaction was further continued at the same temperature for 2 hours. After completion of the reaction, the reaction product was purified to give 3,700 g of an organic compound having a viscosity of 2,100 cps (25° C.) and a number average molecular weight, as calculated from the OH value, of 7,000.

This organic compound corresponds to general formula (1) wherein

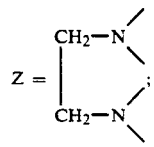

$R^2 = C_6H_5-$; $n=0$; $m=10$; $k=4$; $R^3 =$ a $C_6$ alkylene group; and $a=10$.

To 100 g of the organic compound synthesized above was added a solution of 5.0 g of 2,6-tolylene diisocyanate and 0.05 g of dibutyltin dilaurate in 50 g of methyl ethyl ketone to prepare a curable coating composition.

This curable coating composition was coated on the surface of a polypropylene sheet and caused to dry and cure at 120° C. for 30 minutes to give a sample having a coating thickness of 10 μm (S-12).

COMPARATIVE EXAMPLE 3

In a 5 l autoclave, 92 g of glycerol was reacted with 3,200 g of alkylene oxide (ethylene oxide/propylene oxide=80/20, by weight) in the presence of 9 g of potassium hydroxide at 120° C. for 6 hours (random reaction) and the reaction was further continued at the same temperature for 2 hours. After the reaction was completed, the reaction product was purified to provide 2,900 g of an organic compound having a viscosity of 1080 cps 25° C.) and a number average molecular weight, as calculated from the OH value, of 3,000.

To 100 g of the organic compound synthesized above was added a solution of 8.7 g of 2,6-tolylene diisocyanate and 0.05 g of dibutyltin dilaurate in 50 g of methyl ethyl ketone to give a curable coating composition.

The above curable coating composition was coated on the surface of a polypropylene sheet and caused to dry and cure at 120° C. for 30 minutes to provide a sample having a coating thickness of 10 μm (S-13).

COMPARATIVE EXAMPLE 4

In the presence of 10 g of potassium hydroxide, 136 g of pentaerythritol was reacted with 3,520 g of methyldlethylene glycol glycidyl ether of the formula

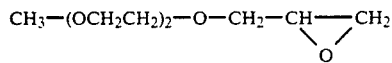

and, then, 176 g of ethylene oxide ar 120° C. for 6 hours (block reaction) and the reaction was further continued at the same temperature for 2 hours. After completion of the reaction, the reaction product was purified to give 3,200 g of an organic compound having a viscosity of 390 cps (25° C.) and a number average molecular weight, as calculated from the OH value, of 3,300.

This organic compound corresponds to general formula (1) wherein

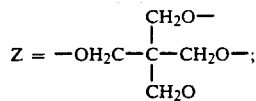

$R^1 = -CH_2CH_2-$; $R^2 = CH-$; $n=2$; $m=5$; $k=4$; $R^3 =$ a $C_2$ alkylene group ; and $a=1$.

To 100 g of the organic compound synthesized above was added a solution of 10.2 g of hexamethylene diisocyanate and 0.05 g of dibutyltin dilaurate in 50 g of methyl ethyl ketone to prepare a curable coating composition.

This curable coating composition was coated on the surface of a polypropylene sheet and caused to dry and cure at 120° C. for 30 minutes to give a sample having a coating thickness of 10 μm (S-14).

EVALUATION OF ADHESION (3)

For estimating the degree of adhesion of the test samples prepared in Examples 6 through 10 and Comparative Examples 3 and 4, each sample was allowed to stand at the varying temperatures shown in Table 3 for one week and, then, subjected to Erichsen test (JIS K5400). The results are shown in Table 3.

TABLE 3

|  | Sample | Score −5° C. | 5° C. | 25° C. |
|---|---|---|---|---|
| Example | S-8 | 10 | 10 | 10 |
|  | S-9 | 10 | 10 | 10 |
|  | S-10 | 8 | 10 | 10 |
|  | S-11 | 10 | 10 | 10 |
|  | S-12 | 8 | 10 | 10 |
| Comparative | S-13 | 0 | 2 | 6 |
| Example | S-14 | 2 | 4 | 8 |

It will be apparent from Table 3 that the polyurethane type curable coating composition of this invention yields a film with excellent adhesion to hydrophobic substrates even at low temperature.

What is claimed is:

1. A polyurethane type curable coating composition comprising an organic compound having a number average molecular weight of 300 to 20,000, which is represented by the following general formula (1), and a polyisocyanate compound $$Z-[(A)_m-(B)_a-H]_k \qquad (1)$$

wherein A means

B means $-R^3O-$;

the mode of bonding between A and B may be random or block;

Z means an active hydrogen compound residue;

$R^1$ means an alkylene group containing 1 to 10 carbon atoms;

$R^2$ means an alkyl group, an alkenyl group, an aryl group, an alkylaryl group or an aralkyl group each containing 1 to 20 carbon atoms;

$R^3$ means an alkylene group containing 2 to 30 carbon atoms;

a means a number of 0 to 100;

k means a number of 1 to 12;

m means a number of 1 to 250; and n means a number of 0 to 5.

2. A polyurethane type curable coating composition according to claim 1 wherein $R^3$ means an alkylene group containing 2 to 3 carbon atoms.

3. A polyurethane type curable coating composition according to claim 1 wherein $R^3$ means an alkylene group containing 4 to 30 carbon atoms and a means a number of 1 to 100.

* * * * *